Feb. 14, 1933.  J. RIEDEL ET AL  1,897,335
CORRUGATED METAL FASTENER
Filed Oct. 3, 1930

Inventors:
Joseph Riedel,
and John Domagall,
Hamilton Maze,
By
Jones, Addington, Ames & Seibold,
Attorneys.

Patented Feb. 14, 1933

1,897,335

UNITED STATES PATENT OFFICE

JOSEPH RIEDEL, JOHN DOMAGALL, AND HAMILTON MAZE, OF PERU, ILLINOIS, ASSIGNORS TO W. H. MAZE COMPANY, OF PERU, ILLINOIS, A CORPORATION OF ILLINOIS

CORRUGATED METAL FASTENER

Application filed October 3, 1930. Serial No. 486,102.

Our invention relates to corrugated metal fasteners with particular relation to fasteners for securing in place corrugated metal when used as roofing material or for side wall construction.

Corrugated metal used for building purposes is usually made of galvanized iron, or similar comparatively tough material, and is usually secured in place by means of ordinary nails driven through the corrugated metal and into the wooden sheeting or roof boards. In securing corrugated metal in this manner very serious problems have arisen, due to the fact that moisture enters the building under the heads of the nails and through the openings in the corrugated metal through which the shank of the nail passes. Material of this nature is also subject to very great stresses, due to expansion and contraction caused by sudden changes of temperature and by the intense heat of the material exposed to the sun. This is especially the case when the corrugated metal is used for roofing.

The strains caused by the expansion and contraction of the material cause the nails to be loosened and sometimes even entirely removed, a condition known as "backing out", "popping", or "drawing", thereby allowing the corrugated metal to become loose, as well as allowing water to enter through the nail holes.

Many devices have been used in an attempt to overcome these difficulties, but have heretofore proven unsuccessful. Nails have been used having a soft head which was usually made of lead, or similar material, and molded around the head of the nail shank. However, in devices of this kind, while the lead would temporarily close the hole made by the nail, it easily became loosened from the shank by the strains set up in the corrugated metal, and it was also easily loosened, if not entirely destroyed, by the use of the hammer in driving the nail, and it was usually necessary to pierce the corrugated metal by the use of some other instrument before driving the nail therethrough to prevent injury to the head.

In our invention we have overcome the above-mentioned difficulties and have provided a corrugated metal fastening means which may be used efficiently to puncture the material, as well as to be completely effective in closing the opening made by the device, and preventing moisture from passing therethrough.

We have also provided a fastening device which effectively resists the strains caused by the expansion and contraction of the corrugated metal, and which will not be loosened by the pressure of the metal thereagainst caused by ordinary temperature changes.

When using the usual type of nail for fastening corrugated metal, it is usually driven through the material in the trough of the corrugations. The reason for driving the nail through this point is because the material at this point is concave and lies against the roof board, and the nail which is used is not so apt to slip from the material and fly from under the hammer. Puncturing the material at this point, however, has the disadvantage that the rain naturally flows in the valleys of the corrugations and enters the nail holes. It is, therefore, of considerable advantage to drive the fasteners through the top of the corrugations. However, this has not been found possible when using the usual fasteners, as they are of resilient material and this resilience causes them to spring slightly when struck and the point slips on the material and the nail flies from under the hammer. In our invention we have also overcome these difficulties and provide a fastener which may be easily driven through the material at the highest point of the corrugations, and which, while it is made of a single piece of metal, is so constructed that a cushioning effect is provided between the hardened pilot of the fastener and the hammer head while the device is being driven in place.

Further objects will be apparent from the specification and the appended claims.

Figure 1:
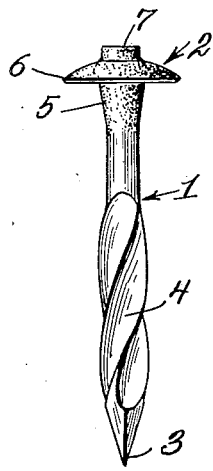
Figure 1 is a side elevation of our improved fastener.
Figure 2:
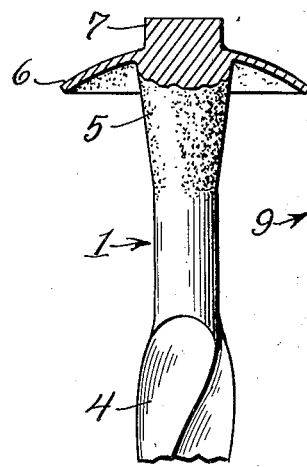
Fig. 2 is a fragmentary detail of substantially the upper half of the fastener illustrated in Figure 1, the head being shown in axial section.

Referring to the drawing in detail, the embodiment illustrated comprises a shank portion indicated generally as 1 and a head indicated as 2. The shank is sharply pointed at 3 and a substantial portion of its length adjacent the point is provided with high pitch threads 4.

The threads are preferably made by pressing the shank to form a rectangular cross section and then twisting the squared portion to form the threads. This forms a concave thread in which the diameter of the shank at the top of the thread is substantially greater than the diameter of the unthreaded portion of the shank.

The head 2 is integral with the shank and preferably formed by being swaged to the desired shape and form, and comprises a tapered portion 5 terminating in an outwardly extending and comparatively thin concave flange 6 and an upwardly extending cylindrical driving head 7. The driving head 7 is a continuation of the shank 1 and is of substantially the same diameter. In use, the upwardly extending driving head prevents the hammer from injuring the flange 6 and allows the flange to automatically conform to the contour against which it is driven.

In the development of this invention it was found that if a comparatively large flange was used with a threaded shank as disclosed and the driving head was not provided with a comparatively small contact surface for the hammer, the holding efficiency of the screw threads was greatly diminished as the friction of the hammer head on the flange was sufficient to prevent the screw from turning as it entered the wood and the fibers of the wood were crushed and the fastener could be more easily removed.

Figure 4:
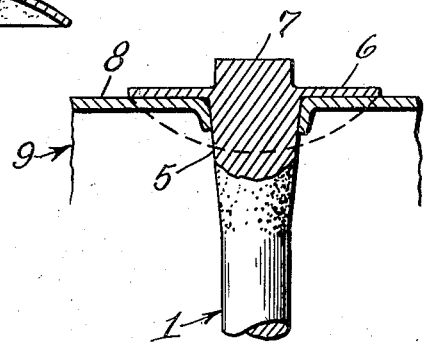
Fig. 4 is a fragmentary detail section through one of the fasteners, taken on a line corresponding to line 4—4 of Fig. 3.
Figure 3:
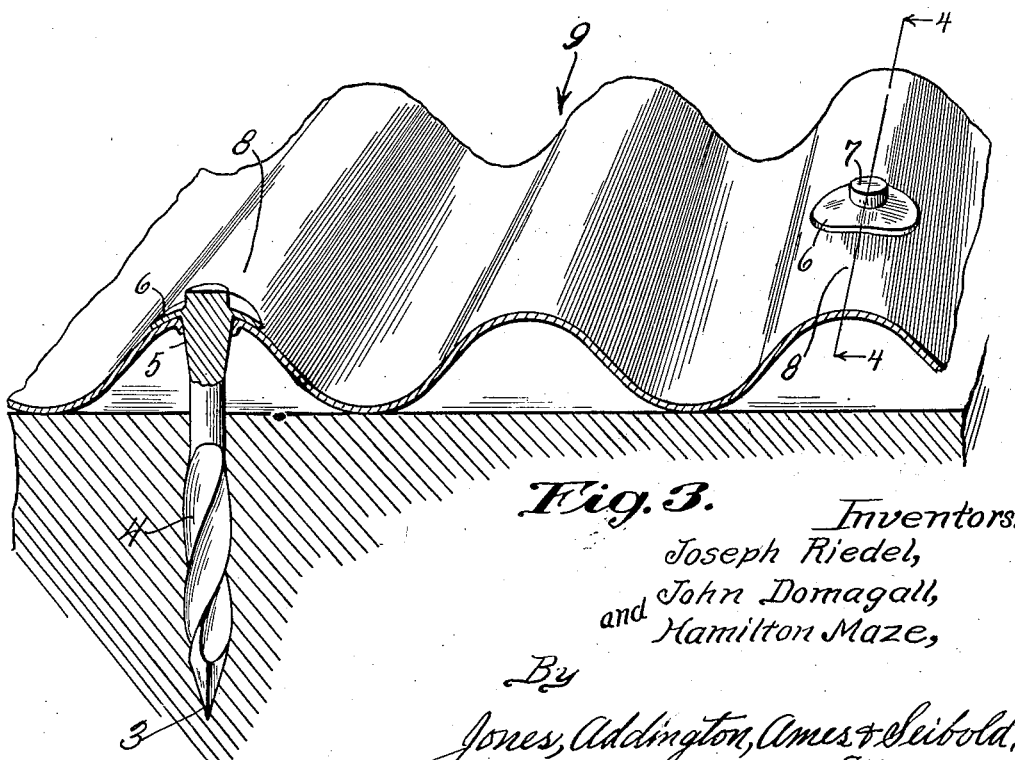
Fig. 3 is a sectional perspective view through a section of corrugated metal as applied to an ordinary roof by means of our improved fastener.

The inner radius of the concave flange is preferably somewhat greater than the outside radius of the corrugation on which it is to be used, so that when the flange is driven against the corrugation, as shown in Figs. 3 and 4, the flange will engage the top of one of the corrugations 8 in the metal sheet 9, and will be bent substantially parallel with the axial line of the corrugation, and the transverse portions of the flange will be drawn down to conform to the cylindrical curvature of the corrugation. In driving in the fastener the tapered portion will completely and snugly fill the hole through the metal.

In order that the flange 6 may easily conform to the contour of the corrugation and that the point and threads may easily pierce the metal, we have found by extended experiments that the head portion 2 must be of soft material and the point and threaded portion must be of hard material.

If the entire fastener is soft the point will not pierce the metal and the shank will crumple under the blows of the hammer. If the entire fastener is of hard material the flange 6 will not form itself to the contour of the corrugation but instead will crumple the material and leave openings for rain and weather to enter.

We have discovered that the above objections may be overcome if the entire head and a substantial part of the shank is made of soft material and the remaining part of the shank of hard material. However, it is necessary that the head and shank be integral. We, therefore, anneal or soften the head and a substantial part of the shank below the flange, the softened portion being indicated by stippling in the drawing. In the embodiment illustrated the head is softened or annealed to a point adjacent the end of the tapered portion 5.

The softened end of the fastener provides a suitable cushion or shock absorber between the hardened hammer head and the hardened portion of the shank, and the tapered portion serves the double purpose of completely filling the hole made by the threaded portion and strengthening the shank to prevent bending of the annealed portion.

By forming the threaded portion 4, as described, with the outside diameter of the threads greater than that of the shank the fastener has been found to withstand a pulling force substantially four times as great as a plain shank and this construction, in combination with an annealed head portion of the character described, has been found to withstand the strains of expansion and contraction, and to prevent water from entering during long periods under all ordinary weather conditions.

Further modifications will be apparent to those skilled in the art and we desire, therefore, to be limited only by the prior art and the scope of the appended claims.

Having thus described our invention, what we claim and desire to secure by Letters Patent is:

1. A corrugated metal fastener of the character described comprising a pointed and threaded shank of hard material, a head formed on said shank and comprising a tapered portion terminating in a concave flange, and a driving extension on the convex side of said flange and in alignment with said shank, all of said head being of softened material and integral with said shank, said flange being softened sufficiently to conform snugly to the contour of the corrugation when the shank is driven completely therethrough and into a support and remaining sufficiently hard to prevent the shank from turning by outward pressure of the corrugation.

2. A corrugated metal fastener of the character described comprising a comparatively hard pointed shank, high pitch threads on said shank adjacent said point, and a head on the opposite end of said shank and integral therewith and comprising a concave flange adjacent the end of said shank, the head portion being annealed sufficiently to conform to the contour of a corrugation when the nail is driven completely in but hard enough to prevent the nail from turning by upward pressure of the corrugation.

3. A nail for corrugated metal comprising a hard metal shank having high pitch threads thereon, a head integral therewith and having a comparatively small striking projection thereon, said head including a comparatively large and relatively thin concave flange, said head being annealed only sufficiently to cause the flange to conform snugly to the curvature of the corrugation when driven completely in and thereby form a lock therewith sufficiently rigid to prevent rotation of the nail from any outward pressure of the corrugation.

In witness whereof, we have hereunto subscribed our names.

JOSEPH RIEDEL.
JOHN DOMAGALL.
HAMILTON MAZE.